Aug. 28, 1962  A. E. FINGER ET AL  3,051,936
ALARM SYSTEM FOR SHOPPING CARTS
Filed Feb. 7, 1961

INVENTORS
ALEXANDER E. FINGER, JOSEPH GOLDMAN
BY
Ezekiel Wolf, Wolf & Greenfield
ATTORNEYS

United States Patent Office 3,051,936
Patented Aug. 28, 1962

3,051,936
ALARM SYSTEM FOR SHOPPING CARTS
Alexander E. Finger, 52 County Road, Chelsea 50, Mass., and Joseph Goldman, 48 Vernon St., Medford, Mass.
Filed Feb. 7, 1961, Ser. No. 87,568
9 Claims. (Cl. 340—280)

This invention relates to shopping carts and more particularly comprises a signaling system which indicates the presence of goods on the lower rack of shopping carts.

In recent years the method of retailing goods of all varieties has experienced many changes. Now virtually all types of goods from food to millinery are sold in large self service retail establishments wherein the customer transports all of his purchases in a shopping cart to a checkout station disposed near the store exit. At the checkout station, the customer unloads the contents of the shopping cart on to a counter behind which is stationed a clerk who rings up the price of the merchandise on a register. The shopping carts commonly used include a deep upper basket and a lower rack for carrying the customer's merchandise. Ordinarily the lower rack of the shopping cart is not within the view of the clerk when the cart is adjacent the counter, and, therefore, those customers so inclined may carry merchandise through the checkout station on the lower rack without paying for it and without being detected by the clerk. It is also possible for a customer when leaving the store to forget personal belongings placed on the lower rack.

The primary object of our invention is to introduce into self service types of retail stores a signaling system which indicates the presence of goods on the lower shelves of shopping carts when the carts are at the checkout stations.

Another important object of our invention is to provide a signaling system which may easily be incorporated into existing shopping carts at little cost to the owner.

Another important object of our invention is to incorporate an electrical alarm system with which the customers regularly come into contact at the location of the checkout stations of a retail establishment without any danger to the customer.

Another important object of our invention is to provide an alarm system which may readily be incorporated into new shopping carts during their fabrication without adding appreciably to their cost of manufacture.

To accomplish these and other objects, our invention includes a low voltage source and an alarm connected in series between a pair of fixed contact strips embedded in the floor of a store at each checkout station. The strips are so located in the floor that every cart which passes through the checkout station passes over the two strips. Carried on the cart as a part thereof is a special framework disposed on the lower rack. The framework is made of electrically conducting material but is supported by insulating strips above the rack so as to be ordinarily free of electrical contact with it. The framework, however, is made of a flexible material which, when goods are placed thereon, will distort somewhat and actually contact the lower rack of the cart. A pair of contact legs are secured to the sides of the cart and continuously engage the floor as the shopping cart is wheeled about the store. One of the contact legs is electrically connected to the framework and insulated from the cart itself while the other leg is electrically connected to the cart frame. The positions of the legs are such that when the carts are wheeled through the checkout station one leg physically engages each contact strip in the floor. When a package of any kind rests on the framework immediately above the lower rack, the two leg contacts are electrically connected to one another, and when they in turn engage the strip contacts in the floor a circuit is completed for the alarm to signal the actual presence of the goods on the cart.

These and other objects and features of our invention, along with incident advantages, will be better understood and appreciated from the following detailed description of one embodiment thereof, selected for purposes of illustration and shown in the accompanying drawing in which.

Figure 1:
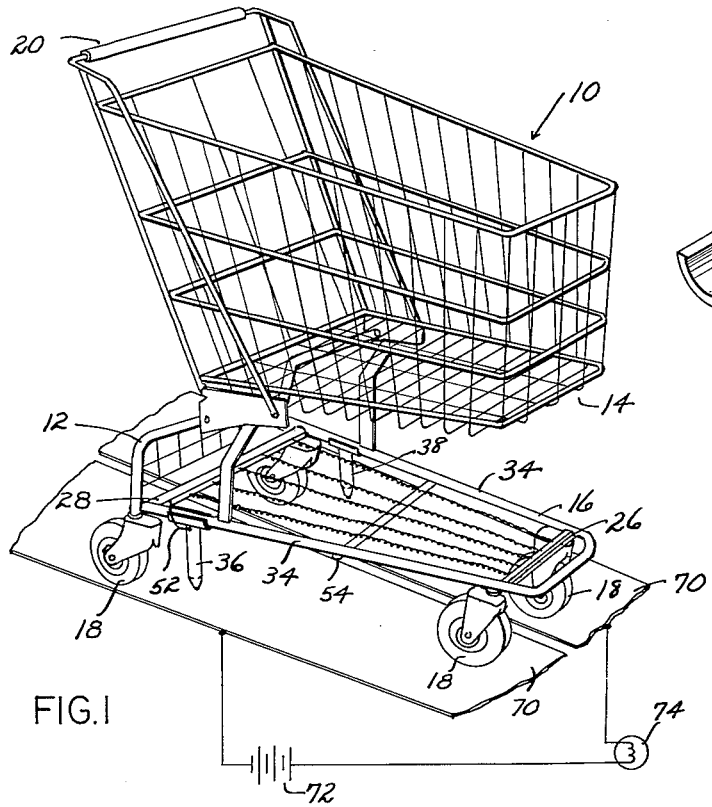
FIG. 1 is a perspective view of a shopping cart embodying our invention.
Figure 3:
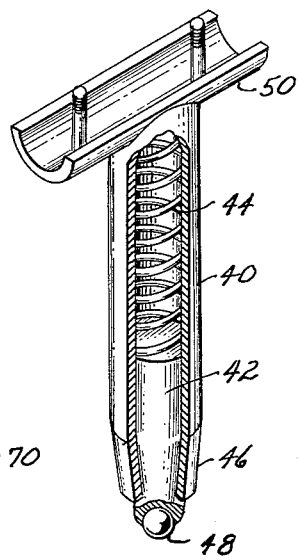
FIG. 3 is a view in perspective partially broken away of a portion of the shopping cart shown in FIG. 1.

The embodiment of our invention shown in FIG. 1 includes a shopping cart 10 of conventional shape and design having a frame 12, an upper or main basket 14, a lower rack 16 and supporting rollers 18. The shopping cart is adapted to be wheeled about the store by the customer and a handle 20 is conveniently provided for this purpose.

Figure 2:
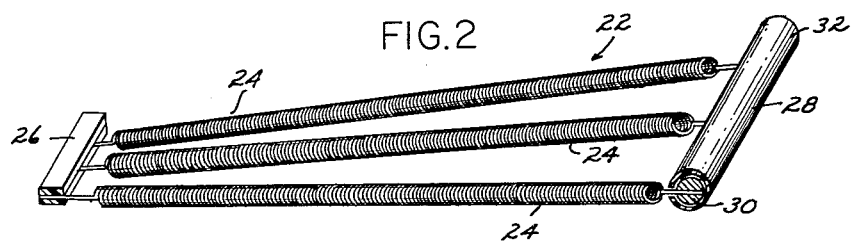
FIG. 2 is a view in perspective of a portion of the cart shown in FIG. 1.

The structure thus far described is in all ways conventional and may be found in virtually all shopping carts used today. Added to these conventional features are other features which render it unique and capable of performing the several objects of our invention. In FIG. 2 a portion of platform 22 is illustrated which is incorporated into the lower rack 16 of the cart 10. As shown in FIG. 2, the platform includes a number of conducting rods 24 each of which preferably is made of flexible material. The conducting rods 24 illustrated are made of helical springs which extend between bars 26 and 28. The bar 26 is made of a nonconducting material while the bar 28 has a core 30 made of conducting material and surrounded by a sleeve 32 which is an electrical insulator. The platform 22 may include many more conducting rods 24 and they may take other forms, such as thin metallic strips. The platform as described is placed upon the lower rack 16 of the cart as suggested in FIG. 1. The bars 26 and 28 which serve as supports or frame members for the platform extend across the frame 12 between the side tubular frame members 34 of the lower rack 16 and may be held in place by virtually any arrangement. It is, however, necessary that the bars 26 and 28 remain insulated from the cart structure and more particularly its lower rack in the absence of bundles on the rack. The nature of the material from which the bar 26 is made and the insulating cover 32 provided for the bar 28 make this condition readily attainable.

A pair of contact legs 36 and 38 are fastened to the tubular frame members 34 at the sides of the rack 16. Each of the leg contacts 36 and 38 includes a sleeve 40 within which is positioned a plug 42 biased to a downward position within the sleeve 40 by a spring 44. Note that the lower end 46 of the sleeve 40 is somewhat tapered to prevent the plug 42 from being forced out of the sleeve 40 through its open lower end.

A spherical bearing 48 is embedded in the end of plug 42 and has complete freedom of rotation but will not fall from its seat. A bracket 50 is provided at the upper end of the sleeve 40 to facilitate securing the leg to the tubular frame members 34.

Leg contact 36 is insulated from the tubular frame member 34 by means of an insulating sleeve (not shown) disposed between the bracket 50 and the tubular frame member 34. While insulated from the member 34 and therefore from the conventional cart structure, a conductor 52 is provided which electrically connects the leg contact with the core 30 of conducting bar 28 of the platform 22. The other contact leg 38 is directly connected to the other tubular frame member 34 on the far side of the cart as shown in FIG. 1 and is in electrical contact with the frame. That is, no insulating material is included in the structure to interfere with this direct electrical communication.

It will be noted in FIG. 1 that the conducting rods 24 forming part of the platform 22 extend immediately over the rack 16 and may form an integral part thereof when my invention is incorporated into the cart during its initial fabrication. When bundles of any kind are placed on the lower rack they flex the rods 24 and cause them to engage the slat 54 which forms part of the lower rack 16. It is to be understood that the rack 16 may include a plurality of slats parallel to the one shown and which extend between the tubular side members 34. Ordinarily the rods 24 are disposed a short distance above the slat 54 and do not engage it. Only by virtue of the weight of the goods placed on the lower rack is contact made between the slat 54 and one or more of the rods. When contact is made it will be recognized that contact leg 36 is placed in electrical communication with the other contact leg 38 through a circuit which may be traced from ball 48 through plug 42 and sleeve 40, conductor 52, core 30 of the framework, one or more of the rods 24, slat 54, frame 12 which includes tubular frame members 34, and the components of the other leg contact 38.

Figure 4:
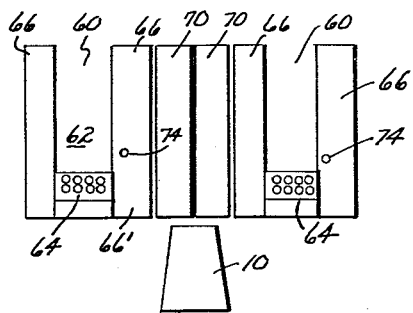
FIG. 4 is a digrammatic plan view of a pair of adjacent checkout stations in a shopping center into which our invention is incorporated.

Having described the portion of our invention physically incorporated into the shopping cart itself, we will now describe the portion of the device permanently installed in the nature of fixtures in the store. In FIG. 4 we have shown a plan view of a pair of adjacent checkout stations 69 of the type which may be found in any self service retail store. The areas 62 are normally occupied by clerks who tabulate the sales of customers on registers 64. Each checkout station includes a counter 66 upon which the customer places the contents of his cart to be checked out of the store after completing his purchases. Normally, the customer empties his cart 10 when it is in the position shown in FIG. 4 by placing the goods on the counter to the purchasers left, and identified as 66'. Thereafter, the purchaser wheels the cart through the path between the adjacent stations to a storage location provided for the carts. In FIG. 4 a pair of wide contact strips 70 are suggested which are the same strips shown in FIG. 1. The wide strips 70 are so sized and positioned to the floor that when the cart 10 passes between the counter 66' and 66 from the position shown in FIG. 4, contact leg 36 engages the right strip 70 and the leg 38 engages the other strip. The strips are so located in the floor that both leg contacts cannot engage the same strip 70, but rather each must engage one of the strips.

The contact strips 70 are connected by a circuit which includes a low voltage power source such as a battery 72 and a signaling device 74 in series. The signaling device 74 may be a lamp, bell or virtually any form of signal, alarm or indicator that may conveniently be sensed by the clerk when it is energized. In FIG. 4 we suggest that the signaling device 74 may be embedded in or mounted on the checkout counter 66. Preferably the light or other indicator employed should not be noticeable by the customer, as the customer could be offended if it was pointedly called to his attention that his cart was in effect subject to inspection. For this reason, while the signaling device could be carried on the cart itself, this is not deemed to be as desirable as placing it in an inconspicuous place observable only by the clerk.

As described, the circuit for the indicator 74 is completed by the simultaneous engagement of the two strip contacts by an electrical conductor. The special platform 22 and the legs 36 and 38 incorporated into the cart are intended to serve the function of a conductor to interconnect the two strip contacts 70 when goods are carried on the lower rack 16 of the cart. Thus, should a customer either inadvertently or intentionally attempt to wheel the cart 10 through a checkout station without removing bundles from the lower rack 16, the indicator 74 will be energized to serve as a signaling device to the clerk. That is, when bundles are on the lower rack 16, the conducting rods 24 engage the slat 54 of the lower rack to interconnect electrically the contact legs 36 and 38. When these legs in turn engage the respective strips 70, a circuit is completed from the low voltage source 72 to the indicator 74 to energize the same.

From the foregoing description it will be recognized that our invention may readily be incorporated into shopping carts during their initial fabrication or may later be installed as ancillary equipment. The platform may take any number of different forms so long as it primarily serves as a switching device in cooperation with the rack 16 to complete a circuit between the two contact legs 36 and 38 when goods are carried on the lower rack. Using a low voltage source such as a 1.5 volt dry cell renders the electrical system entirely safe and extremely inexpensive to operate. Obviously, when such a voltage source is used absolutely no risk is encountered by shoppers as they walk over the contact strips when they pass through the checkout station behind their carts.

Because numerous modifications may be made of our invention without departing from its spirit, we do not intend to limit the breadth of the invention to the specific embodiment illustrated and described. Rather, it is our intention that the breadth of this invention be determined by the appended claims and their equivalents.

What is claimed is:

1. In combination a shopping cart having a frame made of electrically conducting material, a plurality of rollers supporting the frame for movement on the floor, a rack made of conducting material secured to and in electrical communication with the frame above the rollers and serving as a lower shelf for carrying purchases of a shopper, a leg contact secured to and in electrical communication with the frame and adapted to continuously engage the floor, a plurality of bars made of conducting material disposed immediately above the rack and physically engaging the rack when purchases are placed thereon, a second leg contact secured to the frame and in electrical contact with the bars and adapted to continuously engage the floor, and an electrical circuit including in series an alarm, low voltage source and a pair of spaced contacts disposed in the floor and adapted to be closed when the leg contacts of the cart engage the pair of spaced contacts to energize the alarm.

2. An alarm system for indicating at a checkout stand the presence of goods on the lower shelf of a shopping cart comprising a pair of spaced contacts embedded in the floor adjacent the checkout stand, a signaling device and low voltage source connected in series between the contacts, a shopping cart, a pair of leg contacts secured to the cart and positioned to engage the spaced contacts when the cart is wheeled past the stand, and switch means responsive to the weight of goods on the lower shelf of the cart for electrically connecting the leg contacts to complete the circuit for the signaling device and voltage source to sound the alarm.

3. In an attachment for a shopping cart to indicate the presence of goods on the cart; a plurality of conducting rods secured to a rack on the cart and engaging the rack when goods are placed thereon, a leg contact secured to the cart and communicating electrically with the rack, and a second leg contact electrically connected to the conducting rods, said legs being electrically connected together when the rods engage the rack.

4. An attachment for a movable shopping cart operable with a fixed electrical circuit in a market to energize a signaling device when goods are on the cart comprising a plurality of flexible conducting bars electrically connected with one another, an insulating support connected to the bars for carrying the bars immediately above the rack of the cart whereby the bars may deflect and engage the rack when goods are placed on the bars, and a pair of electrically conducting legs one electrically connected to the bars and the other electrically connectable to the cart for engaging contact points of the fixed electrical circuit, said cart attachment completing said fixed electrical circuit when the flexible bars engage said rack.

5. An alarm system for a shopping center to indicate the presence of bundles on the lower rack of shopping carts comprising a pair of spaced contact strips embedded in the floor at a checkout station in a shopping center, a fixed conducting path connected between said contact strips, an electrical circuit including a normally open switch means carried by the cart and forming an alarm circuit with the fixed conducting path and contact strips when said electrical circuit physically engages said strip contacts, said electrical circuit engaging said contact strips when the cart is wheeled by the checkout station, an energy source and an alarm connected in the alarm circuit, and means for closing the normally open switch means when goods are placed on the lower rack of the cart.

6. An alarm system as defined in claim 5 further characterized by said energy source comprising a low voltage source disposed in the fixed conducting path.

7. In combination with a platform having a pair of spaced bars, one of said bars being made of electrically nonconducting material and the other of said bars being made of electrically conducting material, a plurality of flexible conducting rods extending between the bars and each electrically connected to the conducting bar, and an insulating cover surrounding said conducting bar; a shopping cart having a bottom rack upon which the platform is supported normally electrically insulated therefrom by said insulating cover and nonconducting bar, a pair of contact legs extending downward from and mounted on the cart and separately electrically connected to the rack and to the platform, said platform and rack engaging one another to place the two leg contacts in electrical communication with one another when goods are placed on said rack.

8. An alarm system comprising a shopping cart, a prescribed path along which said cart is to move, a pair of contacts disposed in the path, leg contacts secured to the cart and each disposed to engage one contact when the cart is moved along the path, a conducting path independent of the cart interconnecting the contacts, means including a normally open switching device carried by the cart for electrically connecting the leg contacts, said switching means closing in response to the presence of goods on the cart, and an alarm energized in response to the simultaneous engagement of the leg contacts with the contacts and the closing of the switching means.

9. An attachment for a shopping cart having a rack made of electrically conductive material and upon which bundles are to be carried comprising means including a platform having deflectible means made of electrically conductive material supportable above the rack and yielding under the weight of bundles on the rack to electrically contact said rack, and a pair of contact members electrically connected separately to the rack and the platform and in electrical communication with one another when the platform yields and electrically contacts the rack.

References Cited in the file of this patent

UNITED STATES PATENTS

| | | |
|---|---|---|
| 1,686,457 | McClintock | Oct. 2, 1928 |
| 2,438,076 | Stelter | Mar. 16, 1948 |
| 2,818,477 | Gollhofer | Dec. 31, 1957 |
| 2,918,294 | Hennion | Dec. 22, 1959 |